March 18, 1958  A. O. FEIGIN  2,827,185
APPARATUS FOR TRANSPORTING AND HANDLING MATERIALS
Filed Oct. 5, 1955
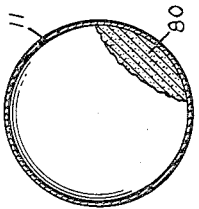
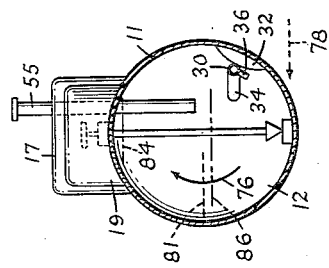
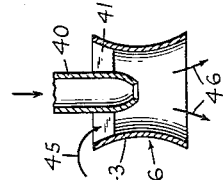
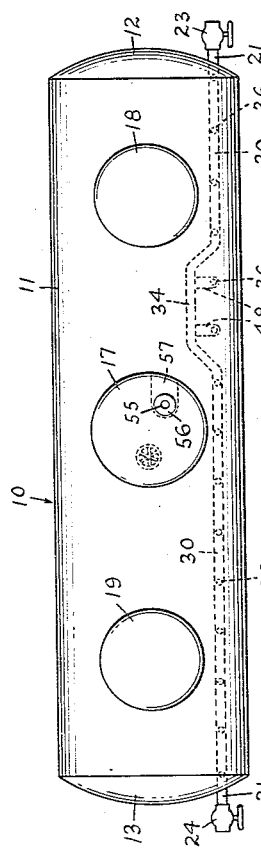
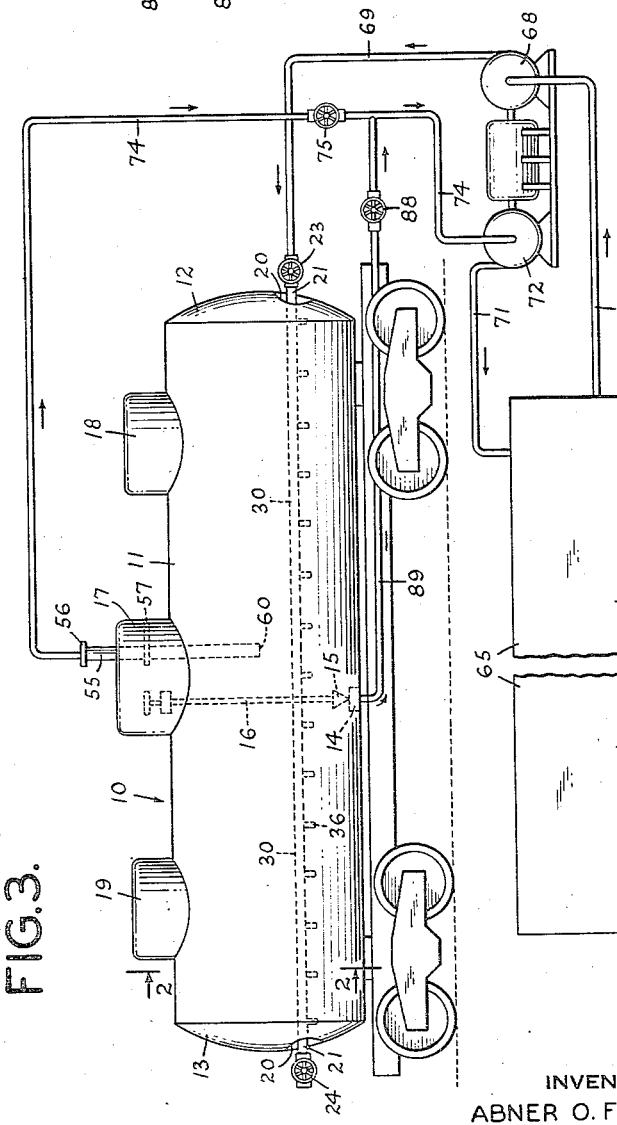
INVENTOR
ABNER O. FEIGIN
BY
ATTORNEY

United States Patent Office 2,827,185
Patented Mar. 18, 1958

2,827,185

APPARATUS FOR TRANSPORTING AND HANDLING MATERIALS

Abner O. Feigin, East Rockaway, N. Y., assignor to Allied Chemical & Dye Corporation, New York, N. Y., a corporation of New York Application October 5, 1955, Serial No. 538,617

4 Claims. (Cl. 214—83.28)

This invention is directed to apparatus for transporting and unloading materials which are normally shipped in bulk from a manufacturer's plant in dry, comminuted, relatively free-flowing solid form, and which are used by the customer in the form of solutions of such materials in solvents, or as highly dispersed suspensions of such materials in liquids. More particularly, the invention relates to improvements in the construction of transportable tanks, e. g. tank cars and tank trucks, and conjunctive unloading equipment.

A major object of the invention lies in the provision of transporting and unloading apparatus constructed so as to facilitate customer unloading convenience, and minimize unloading labor and time.

The invention, other objects and advantages thereof will be apparent from considerations of the following description taken in connection with the accompanying drawings, in which Fig. 1 illustrates, more or less diagrammatically in elevation, a tank car and associated wayside unloading equipment embodying the invention;

Fig. 2 is a vertical section taken approximately on the line 2—2 of Fig. 1;

Fig. 3 is a plan of the tank car of Fig. 1, and

Figs. 4 and 5 are enlarged details in vertical section.

Referring particularly to Fig. 1, 10 indicates a tank car having an elongated cylindrical body 11 closed at either end by heads 12 and 13, and having a bottom unloading outlet 14 and plug valve 15 operated by valve rod 16. The tank is provided with the usual centrally disposed loading dome 17, and preferably with supplemental loading domes 18 and 19 which, in conjunction with dome 17, facilitate substantially complete filling of the tank with any dry pulverulent relatively free-flowing solid material. It will be understood that the loading domes include suitable hinged or detachable covers which seal the tank when loaded and protect the contents thereof from weather and other contamination.

In accordance with the present improvements, each tank head is equipped, at a point below the axial center line thereof and relatively close to the circumference of the tank, with a conventional tank head outlet indicated at 20. The head outlets include short nipples 21 to the ends of which are attached valved couplings 23 and 24. Mounted in the inside of the tank is a longitudinally disposed liquor feed pipe 30 positioned coaxially with respect to nipples 21 and attached at either end in liquid-tight relation, by unions not shown, to the inside ends of tank head outlets 20. At suitable intervals along the inside length of the tank, pipe 30 is supported and held in the position indicated by spaced apart brackets 32 (Fig. 2) riveted at their ends to the tank shell. Preferably, feed pipe 30 includes an offset section 34, shown in plan in Fig. 3 and in end elevation in Fig. 2, purpose of which offset being to permit expansion and contraction of pipe 30 sufficiently to avoid breaking liquid-tight connections at the tank head outlets 20.

Pipe 30 carries a plurality of outlet nozzles 36 one of which is shown in end elevation in Fig. 2. Longitudinal spacing of nozzles on pipe 30 may vary according to circumstances, e. g. 24 inches apart, and is indicated diagrammatically in Figs. 1 and 3. Each nozzle is set on pipe 30 so that the axis of a nozzle is directed downwardly and inwardly, and preferably lies in a line substantially parallel to a line tangential with respect to the curvature of the immediately adjacent surface of the tank. A preferred type of nozzle is shown in axial cross-section in Fig. 4. A nozzle liquor outlet 40 has attached thereto, by webbing 41 or otherwise, a venturi-shaped casing 43 open at both ends. This type of nozzle functions as an aspirator, and a given quantity of liquor passing thru liquor outlet 40, assuming submergence of the nozzle in liquor, sucks in a much greater volume of the surrounding liquor, in the manner indicated by arrow 45, and creates at the outlet of the nozzle, as denoted by arrows 46, a heavy flow of liquor and a high degree of turbulence and agitation.

The offset portion 34 of the liquor feed pipe 30 is provided with nipples 48, Fig. 3, which extend toward the adjacent side of the tank a distance sufficient so that nozzles 36, carried on the ends of such nipples 48, lie in the same plane as the nozzles (Fig. 2) projecting downwardly from the straight section of liquor feed pipe 30. Further, Fig. 3 offset 34 of pipe 30 preferably is positioned longitudinally preferably midway between adjacent loading domes so as to minimize possible damage by direct impact of solid material charged into the adjacent loading domes in relatively large quantities during the car loading operation.

Another element of the present improvements is a vertically disposed liquor outlet 55 which is open-ended at the bottom and is provided at the top with a hose or other coupling 56. Pipe 55 may be supported by a bracket 57 fixed to the inside of the center dome, the supporting connection, i. e. any suitable mechanical expedient not shown, between pipe 55 and bracket 57 being such that pipe 55 is vertically adjustable within an adequate range to regulate vertical position in the tank of the lower open end 60 of pipe 55.

The invention affords markedly improved facilities for the transportation and the unloading, at a customer's location, of materials which are most economically shipped in bulk in dry pulverulent form and which are utilized usually by the immediate customer or consignee of the shipment in the form of liquids of various concentrations. The invention is adapted for use in connection with the transportation and unloading of all initially dry comminuted materials which are utilizable by the customer as a solution in a given solvent, or as an emulsion, or as a suspension of comminuted material in a given liquor, provided preferably that the material is sufficiently finely divided and that the suspension is of such relatively highly dispersed characteristics as not to carry solid material in size or quantity sufficient to impede operation of pumping equipment. The invention is particularly adaptable for transportation and unloading of liquid soluble chemicals normally shipped in dry relatively free-flowing crystalline form, i. e. chemicals which are used by the customer in the form of solutions as distinguished from suspensions. Accordingly, operation employing the improvements of the invention may be conveniently described in connection with the transportation and unloading of initially dry, free-flowing crystalline material such as sodium chlorate which is soluble in water and is shipped from a manufacturing plant as dry pulverulent material, and is to be delivered to the customer as a solution of sodium chlorate in water. Thus, assuming that bottom plug valve 15 and liquor feed pipe valves 23 and 24 of the car are closed, at the manufacturer's plant, the car is loaded with dry, solid, relatively free-flowing sodium chlorate, it being possible to almost completely fill the tank because of the three loading domes provided.

Numeral 65 indicates a stationary wayside liquid storage tank at the customer's location. It will be understood that tank 65 is at least large enough to hold the entire contents of the tank car as a water solution of the particular sodium chlorate concentration desired. Hence, on the arrival of the car at the customer's location, tank 65 is filled with water in quantity necessary to dissolve all the sodium chlorate in the car and to form a solution of the required concentration; line 66, the pressure side of pump 68, and line 69 are connected at the valve 23 to one end of liquor feed pipe 30 in the car; return line 71, the suction side of pump 72, and suction line 74 are coupled to the upper end of car discharge pipe 55; and plug valve 15 and feed pipe valve 24 are kept closed. Pump 68 is put in operation and water under pressure is charged thru nozzles 36 into the lower part of the tank car and into the crystal bed therein. Solution of crystalline material begins and because of the positioning of nozzles 36, within a short time interval the whole mass in the car starts to more or less turn around in e. g. a clockwise direction as indicated by arrow 76, Fig. 2.

As is well known in the art, it is practically impossible to unload dry material from a tank car by introducing solubilizing liquor into the top and attempting to draw off solution thru the usual tank car bottom outlet 14. The problem lies in provision of substantially even distribution of solubilizing liquid and agitation throughout the body of the material in the tank. Notwithstanding many prior suggestions, satisfactory distribution of solubilizing liquid and agitation has not been attained heretofore. Previous proposals have resulted in the formation in various places in the tank of so-called dead spots in which large quantities of substantially dry or only more or less damp material collect and mow up with the result that manual barring or hosing is necessary to break up and agitate the dead spots sufficiently to facilitate solution of the solid in the solubilizing liquid. Even in situations where it has been proposed to inject water and air into the bottom of the tank in the manner indicated generally by the dotted arrow 78 of Fig. 2, the force of the incoming water and air becomes sufficiently dissipated at about the 2 to 3 o'clock position (Fig. 2), to form a mowed-up dead spot of relatively solid material from about the 3 o'clock to close to the 6 o'clock position, as approximately indicated by the shaded portion 80 of Fig. 5.

In accordance with the invention, it has been found and confirmed by actual commercial practice that an even overall solubilizing and agitation distribution may be obtained and the formation of dead spots prevented by injecting the solubilizing liquid, under adequately desirable pressure, by means of nozzle outlets located well within the interior of the tank and approximately in the relative position delineated in the elevation of Fig. 2. As indicated, the nozzle discharge ends are located in a lower quadrant of the tank cross-section, are vertically positioned preferably nearer a horizontal diameter 81 than to the tank bottom, and are horizontally positioned near to but appreciably spaced radially from the adjacent surface of the inside of the tank. Further, as previously described the nozzles are positioned so that the nozzle axes are downwardly directed and are approximately parallel to a line tangential to the curvature of immediately adjacent surface of the tank. Thus, in the better forms of the invention the nozzles are axially directed as described and preferably lie within the 3 to say 4:30 o'clock position looking at a vertical cross-section of the tank from one end of the car as illustrated in Fig. 2. In practice, it has been found that, by the foregoing construction, the force of the incoming dissolving solution is directed immediately to those portions of the tank load at which dead spots and mowing-up tend to occur, and by spacing the nozzles and the header appreciably from the inner face of the tank wall, the possibilities of build-up of damp solid around the nozzles and header and the immediately adjacent tank wall are avoided. Further, in the use of the invention apparatus, points where the force of incoming liquid dissipates correspond to overhanging tank wall where there is no tendency toward dead spot formation.

Injection of water thru nozzles 36 is continued until liquid level in the car reaches approximately line 84, Fig. 2. At this stage, the contents of the car comprise a heavy crystal slurry the top of which is about at line 86 which is below the inlet end of outlet pipe 55, and a supernatant body of clear crystal-free solution lying between levels 86 and 84.

When the foregoing condition is reached, valve 75 in line 74 is opened, pump 72 is put in operation, and clear liquid is drawn out of the upper part of the car through pipe 55, line 74, pump 72 and returned thru line 71 to the storage tank. Operation of both pumps is continued and crystal-free liquor is continuously circulated from the storage tank thru the car until all the crystal material in the bottom of the car has been dissolved. During recirculation of liquor, the mass in the car is kept churning in the clockwise direction of arrow 76. After all material in the car has been put into solution, as by any suitable test e. g. gravimetric, pump 68 is stopped, valves 23 and 75 are closed, valve 88 is opened, and the plug valve 15 in the bottom of the car is opened. Pump 72 then draws the remaining clear liquid out of the car thru outlet 14, line 89, line 74, pump 72 and line 71 into tank 65, pump 72 being kept in operation until the car is drained.

The bottom inlet end of outlet pipe 55 may be vertically adjusted so that whatever the slurry level in the car may be, the pipe 55 projects only into clear supernatant liquid, and during use of outlet pipe 55, line 74, pump 72 and line 71, nothing is drawn into pipe 55 except clear crystal-free liquor. Valve coupling 24 on the opposite end of the car is merely to facilitate introduction of dissolving liquid into either or both ends of the car.

In practical commercial operation of the invention, it has been possible to unload a car containing about 80,000 lbs. of sodium chlorate in as little as 6 hours, using only one man. These results are obtained notwithstanding the fact that equipment in the car includes no moving parts, and no agitating medium other than the solvent liquid is employed. Further, the only openings thru the tank proper are in the tank heads (providing for the tank head outlets 20) a construction which meets governmental and railroad specifications.

I claim:

1. A transportable container comprising an elongated horizontally disposed cylindrical tank, means including an opening in the top of the tank adapted to facilitate loading of the same with material in comminuted substantially dry form, a liquor outlet conduit through which liquor containing said material is adapted to be withdrawn, said conduit having the inlet end thereof adapted to open into the upper portion of the tank, a liquor outlet in the bottom of the tank for discharging liquor therefrom, and means for injecting liquid into the tank to effect formation of a withdrawable liquor containing said material, said injecting means comprising a plurality of spaced-apart nozzles, each nozzle being positioned wholly within the confines of the tank, in a lower quadrant thereof, adjacent the tank wall, and being substantially spaced from the tank bottom, said nozzles having the axes thereof directed downwardly and inwardly toward the bottom of the tank, a longitudinally disposed header connected to and adapted to supply liquid to said nozzles, said header being positioned wholly within the confines of the tank, and means including a liquid inlet located in a head of the tank for supplying liquid to said header.

2. The apparatus of claim 1 in which the said header and nozzles are adjacent to but substantially spaced from the tank wall; the said nozzles are located in the approximate range of the three to four-thirty o'clock position when viewed from an end of the tank; the axes of the nozzles are directed downwardly and substantially parallel to a line tangential to the immediately adjacent surface of the tank; and the said liquor outlet conduit is vertically adjustable.

3. The apparatus of claim 1 in which the header includes an expansion-contraction offset portion, and nozzles associated with said portion are arranged so that the axes thereof lie in substantially the same plane as axes of the nozzles associated with straight line portions of said header.

4. The apparatus of claim 1 in which the said liquor outlet conduit projects into said tank and is adjustable to facilitate variable elevation of the inlet end of said conduit within at least the upper half of said tank.

References Cited in the file of this patent

UNITED STATES PATENTS

| | | |
|---|---|---|
| 1,436,700 | Eliel | Nov. 28, 1922 |
| 2,143,273 | Ladd | Jan 10, 1939 |
| 2,505,194 | Loss | Apr. 25, 1950 |
| 2,516,884 | Kyame | Aug. 1, 1950 |
| 2,582,198 | Etheridge | Jan. 8, 1952 |

FOREIGN PATENTS

| | | |
|---|---|---|
| 644,638 | Great Britain | Oct. 18, 1950 |